United States Patent
Rose et al.

(10) Patent No.: US 10,186,263 B2
(45) Date of Patent: Jan. 22, 2019

(54) SPOKEN UTTERANCE STOP EVENT OTHER THAN PAUSE OR CESSATION IN SPOKEN UTTERANCES STREAM

(71) Applicant: Lenovo Enterprise Solutions (Singapore) PTE. LTD., New Tech Park (SG)

(72) Inventors: Amy Leigh Rose, Chapel Hill, NC (US); John Scott Crowe, Durham, NC (US); Gary David Cudak, Wake Forest, NC (US); Jennifer J. Lee-Baron, Morrisville, NC (US); Nathan J. Peterson, Oxford, NC (US); Bryan L. Young, Tualatin, OR (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 73 days.

(21) Appl. No.: 15/251,086

(22) Filed: Aug. 30, 2016

(65) Prior Publication Data

US 2018/0061399 A1 Mar. 1, 2018

(51) Int. Cl.
| | | |
|---|---|---|
| G01L 21/00 | (2006.01) | |
| G10L 15/22 | (2006.01) | |
| G10L 15/04 | (2013.01) | |
| G10L 15/18 | (2013.01) | |
| G10L 15/08 | (2006.01) | |

(52) U.S. Cl.
CPC .............. *G10L 15/22* (2013.01); *G10L 15/04* (2013.01); *G10L 15/1822* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 7,610,199 B2* | 10/2009 | Abrash | ................... | G10L 25/87 704/233 |
| 7,716,058 B2* | 5/2010 | Roth | ....................... | G10L 15/19 704/277 |
| 9,437,186 B1* | 9/2016 | Liu | ......................... | G10L 15/05 |
| 2004/0049388 A1* | 3/2004 | Roth | ....................... | G10L 15/19 704/251 |
| 2004/0267528 A9* | 12/2004 | Roth | ....................... | G10L 15/19 704/251 |
| 2016/0125883 A1* | 5/2016 | Koya | ...................... | G10L 15/30 704/232 |
| 2016/0275952 A1* | 9/2016 | Kashtan | .................. | G10L 17/00 |

(Continued)

*Primary Examiner* — Satwant K Singh
(74) *Attorney, Agent, or Firm* — Jason Friday (57) ABSTRACT

Speech recognition of a stream of spoken utterances is initiated. Thereafter, a spoken utterance stop event to stop the speech recognition is detected, such as in in relation to the stream. The spoken utterance stop event is other than a pause or cessation in the stream of spoken utterances. In response to the spoken utterance stop event being detected, the speech recognition of the stream of spoken utterances is stopped, while the stream of spoken utterances continues. After stopping the speech recognition of the stream of spoken utterances has been stopped, an action is caused to be performed that corresponds to the spoken utterances from a beginning of the stream through and until the spoken utterance stop event.

12 Claims, 6 Drawing Sheets

(56) References Cited

U.S. PATENT DOCUMENTS

2018/0061409 A1\* 3/2018 Valentine ................. G10L 15/22
2018/0061412 A1\* 3/2018 Cho ........................ G06F 3/167
2018/0173494 A1\* 6/2018 Choi ....................... G06F 3/167
2018/0204571 A1\* 7/2018 Nada ....................... G10L 13/02

\* cited by examiner

SPOKEN UTTERANCE STOP EVENT OTHER THAN PAUSE OR CESSATION IN SPOKEN UTTERANCES STREAM

BACKGROUND

Using voice commands has become a popular way by which users communicate with computing devices. For example, a user can issue a voice command to a mobile computing device, such as a smartphone, to initiate phone calls, receive navigation directions, and add tasks to to-do lists, among other functions. A user may directly communicate with a computing device like a smartphone via its microphone, or through the microphone of another device to which the computing device has been communicatively linked, like an automotive vehicle.

SUMMARY

An example method includes, after initiating speech recognition of a stream of spoken utterances, detecting, by a computing device that initiated the speech recognition of the stream, a spoken utterance stop event to stop the speech recognition. The spoken utterance stop event is other than a pause or cessation in the stream of spoken utterances. The method includes, in response to detecting the spoken utterance stop event, stopping, by the computing device, the speech recognition of the stream of spoken utterances, while the stream of spoken utterances continues. The method includes, after stopping the speech recognition of the stream of spoken utterances, causing, by the computing device, an action to be performed that corresponds to the spoken utterances from a beginning of the stream through and until the spoken utterance stop event.

An example system includes a microphone to detect a stream of spoken utterances. The system includes a processor, and a non-transitory computer-readable data storage medium storing computer-executable code. The processor executes the code to initiate speech recognition of the stream of spoken utterances while the microphone is detecting the stream. The processor executes the code to, while the speech recognition of the stream of spoken utterances is occurring, determine that a spoken utterance stop event has occurred in relation to the stream. The spoken utterance stop event is other than a pause or cessation in the stream. The processor executes the code to, in response to determining that the spoken utterance stop event has occurred, cause an action to be performed corresponding to the speech recognition of the stream through and until the spoken utterance stop event.

An example non-transitory computer-readable data storage medium storing computer-executable code. A computing device executes the code to, while speech recognition of a stream of spoken utterances is occurring, determine that a spoken utterance stop event has occurred in relation to the stream. The spoken utterance stop event is other than a pause or cessation in the stream. The computing device executes the code to, in response to determining that the spoken utterance stop event has occurred, cause an action to be performed corresponding to the speech recognition of the stream through and until the spoken utterance stop event.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, users have increasingly employed voice commands to interact with their computing devices. A user can indicate to a computing device like a smartphone that he or she wishes to transmit a voice command by pressing a physical button on the computing device or another device to which the computing device is linked, or by speaking a predetermined phrase if the computing device constantly listens for spoken utterance of this phrase. Once the user has made this indication, he or she then speaks the voice command.

The voice command takes the form of a stream of spoken utterances. Depending on the voice command in question, the stream may be relatively brief, such as "call Sally at her mobile number," or lengthy. As an example of the latter, a user may ask for complicated navigation directions to be provided when the user is driving. For instance, the user may request, "provide me with directions to Bob's Eatery on Fifth Avenue, but I don't want to drive on any highways to get there."

After the user has indicated to a computing device that he or she wants to transmit a voice command, the computing device therefore performs speech recognition on the stream of utterances spoken by the user. The computing device does not have any way of knowing, however, when the user has finished speaking the stream of utterances forming the voice command. Therefore, conventionally the computing device waits for a pause or cessation in the stream of spoken utterances, and assumes that the user has finished the voice command when the users pauses or stops the spoken utterances stream.

However, forcing the user to pause to stop within a stream of spoken utterances to indicate to a computing device that he or she has finished conveying the voice command is problematic. For example, a user may be in a setting with other people, as is the case where the user is the driver of a motor vehicle in which other people are passengers. The user may be conversing with the passengers when he or she wants to issue a voice command. After completing the voice command, the user has to unnaturally stop speaking—and indeed may have to force the other passengers to also stop speaking—until the computing device recognizes that the stream of spoken utterances forming the voice command has finished. In other words, the user cannot simply continue talking with the passengers in the vehicle once the voice command has been completely articulated, but instead must wait before continuing with conversation.

Techniques disclosed herein, by comparison, permit a user to continue speaking a stream of utterances, without a pause or cessation. The computing device receiving the voice command recognizes when the stream of spoken utterances no longer is relevant to the voice command that the user is issuing. Specifically, the computing device detects a spoken utterance stop event, other than a pause or cessation, in the stream of spoken utterances. Once such a spoken utterance stop event has been detected, the computing device causes an action to be performed that corresponds to the spoken utterances from the beginning of the stream through and until the spoken utterance stop event within the spoken utterances stream.

Figure 1:
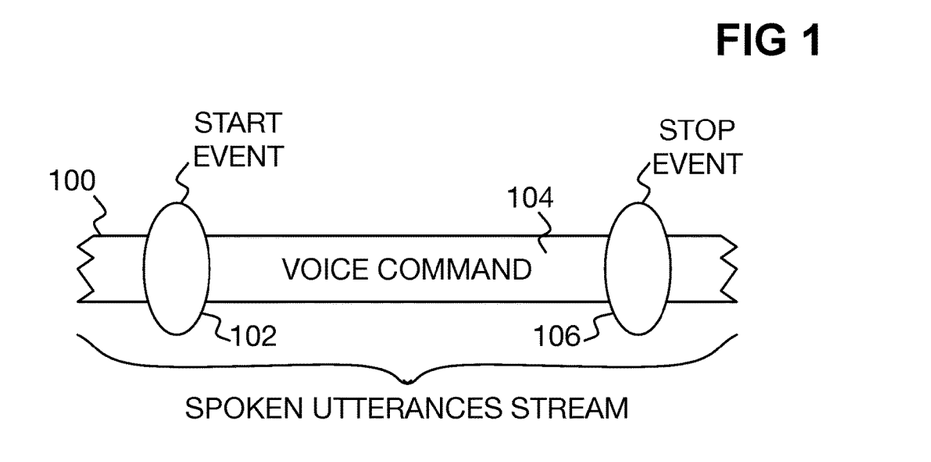
FIG. 1 is a diagram of an example stream of spoken utterances in which a spoken utterance stop event other than a pause or cessation in the stream occurs.

FIG. 1 illustratively depicts an example stream of spoken utterances 100 in relation to which the techniques disclosed herein can be described. A user is speaking the stream of utterances 100. The stream of spoken utterances 100 can be a continuous stream, without any undue pauses or cessations therein other than those present in human languages to demarcate adjacent words or the end of one sentence and the subsequent beginning of the next sentence.

As depicted in the example spoken utterances stream 100 of FIG. 1, a user is speaking, and then issues a start event 102, after the stream 100 has started. However, as another example, the user may not begin speaking the stream of utterances 100 until after the user has initiated the start event 102 or contemporaneously with initiation or issuance of the start event 102 has been issued. One example of a start event 102 is the use pressing or holding a physical control, such as a button on a smartphone, or a button on a steering wheel of an automotive vehicle. Another example of a start event 102 is the user speaking a particular phrase of one or more words, as part of the stream of spoken utterances 100, which is preset as corresponding to the start event 100. For example, the user may say, "Hey, Smartphone."

Once the start event 102 has been initiated, the spoken utterances stream 100 afterwards in time corresponds to the voice command 104 that the user wishes to have performed. More specifically, the spoken utterances stream 100 from after the start event 102 until the spoken utterance stop event 106 corresponds to the voice command 104. The computing device may start speech recognition of the stream 100 after the start event 102 has been received, and stop speech recognition after the stop event 106 has been detected. In another implementation, speech recognition may begin before receipt of the start event 102, and may continue after the stop event 106. For instance, if the start event 102 is the user speaking a particular phrase of one or more words, then the computing device has to continuously perform speech recognition on the stream of spoken utterances 100 to detect the start event. In general, it can be said that speech recognition of the stream 100 as to the voice command 104 itself starts after the start event 102 and ends at the stop event 106.

Different examples of the spoken utterance stop event 106 are described later in the detailed description. In general, however, the stop event 106 is not a pause or cessation in the stream of spoken utterances 100. That is, the user can continue speaking the stream 100 before and after the stop event 106, without having to purposefully pause or stop speaking to convey to the computing device that the voice command 104 has been completed. The stop event 106 can be active or passive with respect to the user in relation to the computing device. An active stop event is one in which the user, within the stream 100, purposefully conveys to the computing device that the user is issuing the stop event 106. A passive stop event is one in which the computing device detects that the user has issued the stop event 106, without any purposeful conveyance on the part of the user to the computing device.

The speech recognition that the computing device performs on the stream 100 of spoken utterances, from the start event 102 to the spoken utterance stop event 106, can be achieved in real-time or in near-real time. Once the stop event 106 occurs, the computing device causes an action to be performed that corresponds to the voice command 104 conveyed by the user. That is, once the stop event 106 occurs, the computing device causes an action to be performed that corresponds to the spoken utterances from the beginning of the stream 100—which can be defined as after the start event 102 having occurred—through and to the stop event 106. The computing device may perform the action itself, or may interact with one or more other devices to cause the action. For example, if the voice command 104 is to provide navigation instructions to a destination, a smartphone may itself provide the navigation instructions, or may cause a navigation system of the automotive vehicle in which it is located to provide the navigation instructions to the user.

Figure 2A:
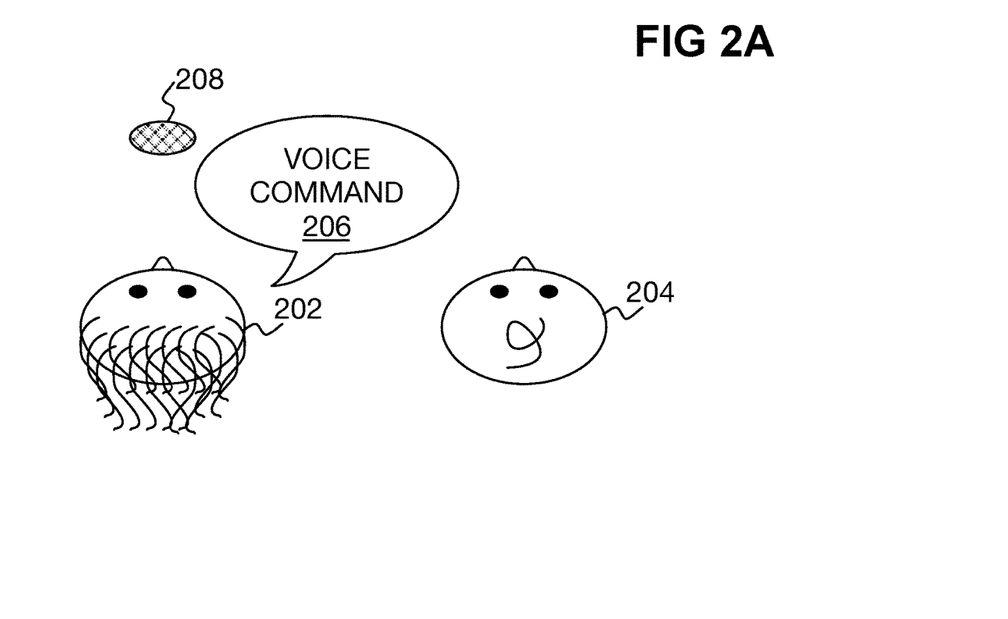
FIGS. 2A and 2B are diagrams of an example spoken utterance stop event that is a change in direction within a stream of spoken utterances.
Figure 2B:
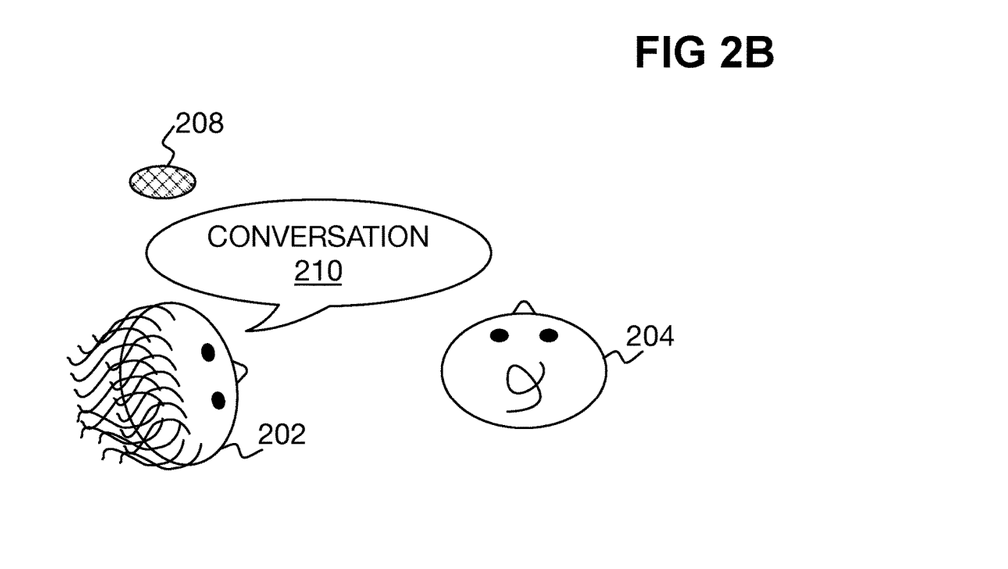

FIGS. 2A and 2B show an example of the spoken utterance stop event 106 of FIG. 1. The stop event 106 depicted by way of FIGS. 2A and 2B is a change in direction of the stream of spoken utterances 100 of FIG. 1 by a user 202 from a first direction towards a microphone 208 to a second direction away from the microphone 208. In the example of FIGS. 2A and 2B, another person 204 is next to the user 202. The microphone 208 is in front of the user 202. For example, the user 202 and the person 204 may be seated in the front row of an automotive vehicle, where the user 202 is the driver of the vehicle and the person 204 is a passenger. In this example, the microphone 208 may be disposed within the vehicle, in front of the user 202.

In FIG. 2A, the user 202 has already initiated the start event 102, and is speaking the portion of the spoken utterances stream 100 of FIG. 1, identified as the spoken utterances 206, which corresponds to the voice command 104 of FIG. 1. The user 202 is speaking towards the microphone 208. In FIG. 2B, the user 202 has completed the portion of the spoken utterances stream 100 of FIG. 1 corresponding to the voice command 104 of FIG. 1. Rather, the user 202 is now speaking the portion of the stream 100 corresponding to after the voice command 104 of FIG. 1, which is identified as the spoken utterances 210. The user 202 has turned his or her head away from the microphone 208, and thus may be engaging in conversation with the person 204.

Therefore, the spoken utterance stop event depicted in FIGS. 2A and 2B is a change in the direction of the spoken utterances within the stream 100 of FIG. 1. The spoken utterances have a first direction within the stream 100 in FIG. 2A (i.e., the utterances 206), and have a second direction within the stream 100 in FIG. 2B (i.e., the utterances 210) that is different than the first direction. The computing device detects the spoken utterance stop event when the user 202 turns his or her head, while continuing the spoken utterances stream 100, from the position and direction of FIG. 2A to that of FIG. 2B, with respect to the microphone 208. The user 202 does not have to pause or stop speaking, but rather can fluidly segue from speaking the voice command 104 of the spoken utterances 206 to the conversation with the user 204 of the spoken utterances 210. As an example, the user 202 may say as the voice command 104, "add milk and eggs to my grocery list" in FIG. 2A and then immediately turn his or her head to the user 204 and say to the person 204, "As I was saying, tonight we need to go grocery shopping."

The computing device can detect the change in direction from which the spoken utterances of the stream 100 are originating in a number of different ways. For example, there may be fewer echoes in the spoken utterances 206 in FIG. 2A than in the spoken utterances 210 of FIG. 2B, as detected by the microphone 208. Therefore, to the extent that echo cancellation has to be performed by more than a threshold in processing the audio signal that the microphone 208 detects from the user 202, the computing device may conclude that the direction of the spoken utterances stream 100 has changed from the spoken utterances 206 to the spoken utterances 210. More generally, detecting the change in direction from which the spoken utterances of the stream 100 are originating can be performed according to a variety of other acoustic location techniques, which may be active or passive.

Detecting the change in direction within the stream of spoken utterances 100 thus does not have to involve speech recognition. That is, different signal processing may be performed to detect the change in direction of the utterances within the stream 100 as compared to that which is used to recognize the speech of the stream 100 as to what the user 202 has said. Similarly, detecting the change in direction within the stream 100 does not have to involve detecting the speech pattern of the user 202 in making the utterances 206 as compared to the utterances 208. For example, detecting the change in direction can be apart from detecting the tone, manner, or style of the voice of the user 202 within the utterances 206 as compared to the utterances 208.

Detecting the change in direction within the stream 100 as the spoken utterance stop event 106 constitutes a passive stop event, because the user 202 is not purposefully conveying indication of the stop event 106 to the computing device. Rather, the user 202 is naturally and even subconsciously simply turning his or her head from the microphone 208—or from in a direction away from the person 204—towards the person 204. Typical human nature, that is, is to direct oneself towards the person or thing with which one is speaking. Therefore, the user 202 may not even realize that he or she is directing the spoken utterances 206 towards the microphone 208 (or away from the person 204, if the user 202 does not know the location of the microphone 208), and directing the speech utterances 210 towards the person 204.

Figure 3:
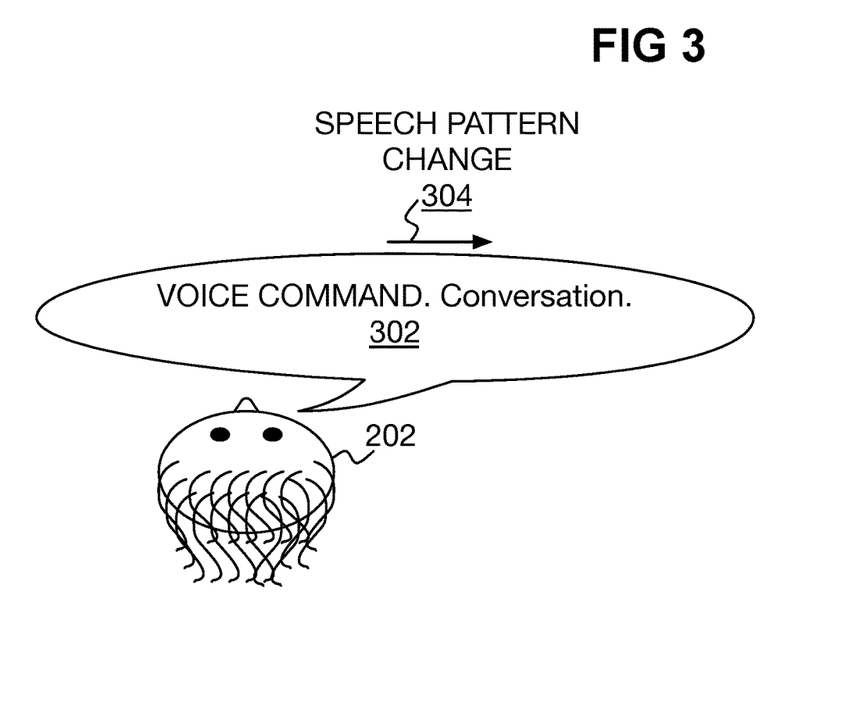
FIG. 3 is a diagram of an example spoken utterance stop event that is a change in speech pattern within a stream of spoken utterances.

FIG. 3 shows another example of the spoken utterance stop event 106 of FIG. 1. The stop event 106 depicted by way of FIG. 3 is a change in speech pattern within the stream of spoken utterances 100 of FIG. 1 by the user 202. In FIG. 3, the user is articulating spoken utterances 302, which correspond to the spoken utterances 100 of FIG. 1 from after the start event 102 through and after the stop event 106. In the example of FIG. 3, the user 202 is first speaking a voice command, and then engaging in normal conversation, such as with another person located near the user 202.

As indicated by an arrow, there is a speech pattern change 304 of the user 202 between speaking the voice command and engaging in conversation within the spoken utterances 302. Such a change 304 in speech pattern can include a change in tone, a change in speaking style, or another type of change in the manner by which the user 202 is speaking. For example, the user 202 may speak more loudly, more slowly, more monotonically, more monotonously, more deliberately, and/or more articulately when speaking the voice command than when engaging in conversation. The user 202 may speak with a different pitch, tone, manner, or style in articulating the voice command than when engaging in conversation, as another example. Therefore, when the speech pattern change 304 occurs, the computing device detects this change 304 as the spoken utterance stop event 106 of FIG. 1.

The computing device can detect the change 304 in speech pattern in a number of different ways. For example, the loudness, speed, and/or monotony of the voice of the user 202 within the spoken utterances 302 can be measured, and when there is a change by more than a threshold in one or more of these characteristics, the computing device can conclude that the spoken utterance stop event 106 has occurred. Machine learning may be employed, comparing normal, everyday conversation speech patterns with speech patterns used when speaking voice commands, as a way to detect the spoken utterance stop event.

In general, detecting the speech pattern change 304 as the spoken utterance stop event 106 can be considered as leveraging how people tend to interact with machines (i.e., computing devices) as compared to with other people. Many if not most speech recognition techniques are still not as adept at recognizing speech as the typical person is. When interacting with machines via voice, many people soon learn that they may have to speak in a certain way (i.e., with a certain speech pattern) to maximize the machines' ability to understand them. This difference in speech pattern depending on whether a person is speaking to a computing device or to a person frequently becomes engrained and second nature, such that a person may not even realize that he or she is speaking to a computing device using a different speech pattern than with another person. The example of FIG. 3 thus leverages this difference in speech pattern as a way to detect a spoken utterance stop event other than a cessation or pause in the stream of spoken utterances by a user.

Detecting the speech pattern change 304 does not have to involve speech recognition. That is, different signal processing may be performed to detect the change 304 in speech pattern within the spoken utterances 302 as compared to that used to recognize the speech of the utterances 302 regarding what the user 202 actually has said. Similarly, detecting the speech pattern change 304 does not have to involve detecting the change in direction within the spoken utterances stream 100 of the user; that is, the example of FIG. 3 can be implemented separately from the example of FIGS. 2A and 2B.

Detecting the change 304 in speech pattern as the spoken utterance stop event 106 constitutes a passive stop event, because the user 202 may not be purposefully conveying indication of the stop event 106 to the computing device. Rather, as intimated above, the user 202 may naturally over time and thus even subconsciously speak voice commands intended for the computing device using a different speech pattern than that which the user 202 employs when talking with other people. As such, the user 202 may not even realize that he or she is using a different speech pattern when articulating the voice command.

Figure 4:
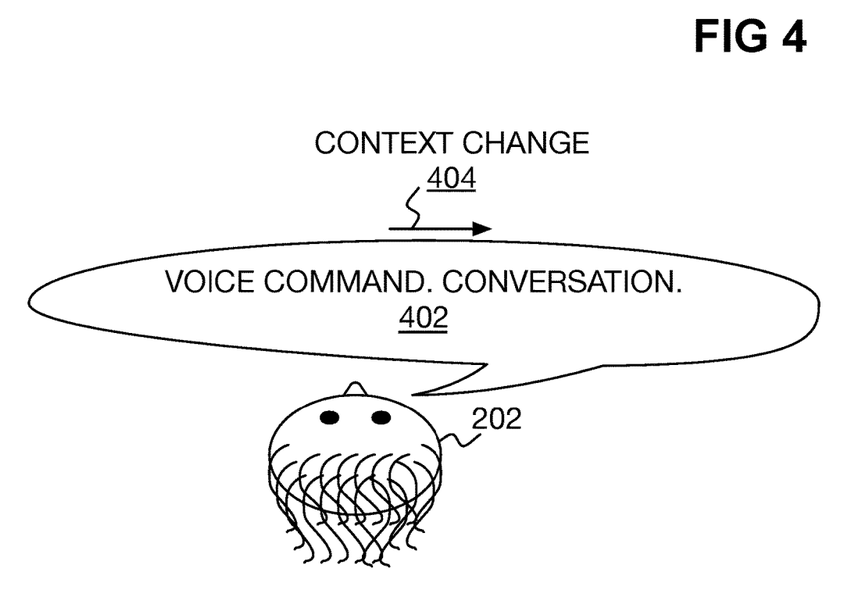
FIG. 4 is a diagram of an example spoken utterance stop event that is a change in context of speech within a stream of spoken utterances.

FIG. 4 shows a third example of the spoken utterances stop event 106 of FIG. 1. The stop event 106 depicted by way of FIG. 4 is a change in context within the stream of spoken utterances 100 of FIG. 1 by the user 202. In FIG. 4, the user is articulating spoken utterances 302, which correspond to the spoken utterances 100 of FIG. 1 from after the start event 102 through and after the stop event 106. In the example of FIG. 4, the user 202 is first speaking a voice command, and then engaging in normal conversation, such as with other people located near the user 202.

As indicated by an arrow, there is a change in context 404 of the spoken utterances 402 between the voice command and the conversation. Generally, the context of the actual words and phrases spoken for the voice command will be different than the context of the actual words and phrases spoken within the conversation. That is, the context of the spoken utterances 402 pertaining to the voice command corresponds to the action that the user 202 wants the computing device to perform. By comparison, the context of the spoken utterances 402 pertaining to the conversation does not correspond or relate to the action that the user 202 wants the computing device to perform.

For example, a parent may be driving his or her kids to a sporting event held at a high school that the parent has not previously visited. Therefore, the parent may say, "Please provide navigation instructions to Main Junior High School. I mean the Main Junior High in Centerville, not the one in Bakersfield. Hey, you two, I think we should watch a movie tomorrow." The context of the second sentence, "I mean the Main Junior High in Centerville, not the one in Bakersfield," corresponds to the context of the voice command of the first sentence, "Please provide navigation instructions to Main Junior High School." The user 202 is specifically clarifying which Main Junior High School to which he or she wants navigation instructions.

By comparison, the context of the third sentence, "Hey, you two, I think we should watch a movie tomorrow," does not correspond to the context of the voice command of the first and second sentences. By nearly any measure, the relatedness or relevance of the third sentence is remote to the prior two sentences. As such, the context of the third sentence is different than that of the first two sentences. The user is speaking a voice command in the first two sentences of the spoken utterances 402, and is engaging in conversation with his or her children in the last sentence of the spoken utterances 402. Therefore, the computing device detects the context change 404 as the spoken utterance stop event, such that the first two sentences prior to the context change 404 are the voice command, and the sentence after the context change 404 is not.

The computing device can detect the change in context 404 generally by performing speech recognition on the utterances 402 as the user 202 speaks them. The computing device can then perform context analysis, such as via natural language processing using a semantic model, to continually determine the context of the utterances 402. When there is a change by more than a threshold, for instance, in the context of the utterances 402 as the spoken utterances 402 occur, the computing device can conclude that spoken utterance stop event 106 has occurred.

Detecting the context change 404 thus involves speech recognition. Therefore, the same speech recognition that is used to understand what the user 202 is requesting in the voice command can be employed in detecting the change in context 404 to detect the spoken utterance stop event 106. As such, detecting the context change 404 does not have to involve detecting the change in direction within the spoken utterances stream 100 of the user, or the change in speech pattern within the stream 100. That is, the example of FIG. 4 can be implemented separately from the example of FIGS. 2A and 2B, as well as separately from the example of FIG. 3.

Detecting the context change 404 as the spoken utterance stop event 106 constitutes a passive stop event, because the user 202 does not have to purposefully convey to the computing device that he or she has finished speaking the voice command. Rather, once the user 202 has finished speaking the voice command, the user can without pausing simply continue or start a conversation, for instance, with another person. It is the computing device that determines that the user 202 has finished speaking the voice command—via a change in context 404—as opposed to the user 202 informing the computing device that he or she has finished speaking the voice command.

Figure 5:
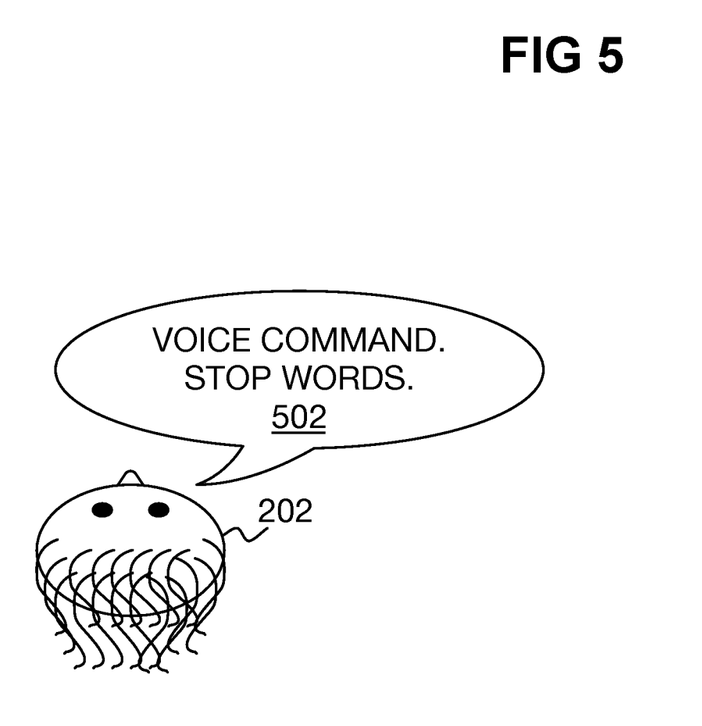
FIG. 5 is a diagram of an example spoken utterance stop event that is a spoken utterance of a phrase of one or more predetermined words.

FIG. 5 shows a fourth example of the spoken utterance stop event 106 of FIG. 1. The stop event 106 depicted by way of FIG. 5 is the utterance by the user 202 of a phrase of one or more stop words within the stream of spoken utterances 100 of FIG. 1. In FIG. 5, the user is articulating spoken utterances 502, which correspond to the spoken utterances 100 of FIG. 1, from after the start event 102 through the stop event 106. In the example of FIG. 5, the user 202 is first speaking a voice command, and then speaks stop words.

The user 202 may know in advance that the phrase of one or more stop words are the predetermined stop words the computing device listens for as an indication that the voice command articulated by the user within the spoken utterances 502 has been completed. As an example, the phrase may be "Finished with command." As an example that is one word in length, the word may be a relatively made-up or nonsensical word that is unlikely to be spoken as part of a voice command or in normal conversation, such as "Shazam."

In another implementation, however, the user 202 may speak a phrase of one or more stop words that have a meaning indicating to the computing device that the user has finished speaking the voice command. In this implementation, the phrase of one or more stop words is not predetermined, and the user can use a variety of different phrases that may not be pre-known to the computing device. However, the phrases all connotate the same meaning, that the user 202 has finished speaking the voice command. Examples of such phrases include, "OK, I'm finished speaking the voice command"; "Please process my request, thanks"; "Perform this instruction"; and so on.

The computing device can detect the utterance of a phrase of one or more stop words within the spoken utterances 502 generally by performing speech recognition on the utterances 502 as the user 202 speaks them. If the phrase of stop words is predetermined, then the computing device may not perform natural language processing to assess the meaning of the spoken utterances 502, but rather determine whether the user 202 has spoken the phrase of stop words. If the phrase of stop words is not predetermined, by comparison, then the computing device may perform natural language processing, such as using a semantic model, to assess the meaning of the spoken utterances 502 to determine whether the user 202 has spoken a phrase of words having a meaning corresponding to an instruction by the user 202 that he or she has completed speaking the voice command. The computing device can also perform both implementations simultaneously: listening for a specific phrase of one or more words that the computing device pre-knows is a stop phrase, while also determining whether the user 202 has spoken any other phrase that corresponds to the user 202 that he or she has completed speaking the voice command.

Detecting the phrase of one or more stop words thus involves speech recognition. The same speech recognition that is used to understand what the user 202 is requesting in the voice command can be employed in detecting this phrase to detect the spoken utterance stop event 106. Detecting the phrase of one or more stop words does not have to involve detecting the context change 404, as in FIG. 4, or detecting the change in direction within the spoken utterances stream 100 as in FIGS. 2A and 2B, or the change in speech pattern within the stream 100 as in FIG. 3.

Detecting the phrase of one or more stop words as the spoken utterance stop event 106 constitutes an active stop event. This is because the user 202 has to purposefully convey to the computing device that he or she has finished speaking the voice command. Although the computing device has to detect the phrase, the user 202 is purposefully and actively informing the computing device that he or she has finished speaking the voice command.

The different examples of the spoken utterance stop event 106 that have been described in relation to FIGS. 2A and 2B, 3, 4, and 5 can be performed individually and in conjunction with one another. Utilizing more than one approach to detect the spoken utterance stop event 106 can be advantageous for maximum user friendliness. The user 202 may not change direction in speaking the voice command as opposed to continuing with conversation, such that an approach other than that of FIGS. 2A and 2B may instead detect the spoken utterance stop event 106. The user 202 may not change his or her speech pattern in speaking the voice command, such that an approach other than that of FIG. 3 may instead detect the stop event 106. The context of the conversation following the voice command may be the same as that of the voice command, such that an approach other than that of FIG. 4 may instead detect the stop event 106. There may be a predetermined phrase of one or more stop words, but the user 202 may not know or remember the phrase, or may not even know that he or she is supposed to speak a phrase to end the voice command, such that an approach other than that of FIG. 5 may detect the spoken utterance stop event 106.

By using the approaches of FIGS. 2A and 2B, 3, 4, and 5 in unison, therefore, the computing device is more likely to detect the spoken utterance stop event 106. Furthermore, the computing device may require more than one approach to successfully detect the stop event 106 before affirmatively concluding that the stop event 106 has occurred. For example, the computing device may require that two or more of a change in direction, a change in speech pattern, and a change in context being detected before concluding that the stop event 106 has indeed occurred. As another example, the computing device may require either the detection of an active stop event, such as the utterance of a phrase of one or more stop words by the user 202, or the detection of two or more passive stop events, such as two or more of a direction change, speech pattern change, or context change, before concluding that the stop event 106 has indeed occurred.

Figure 6:
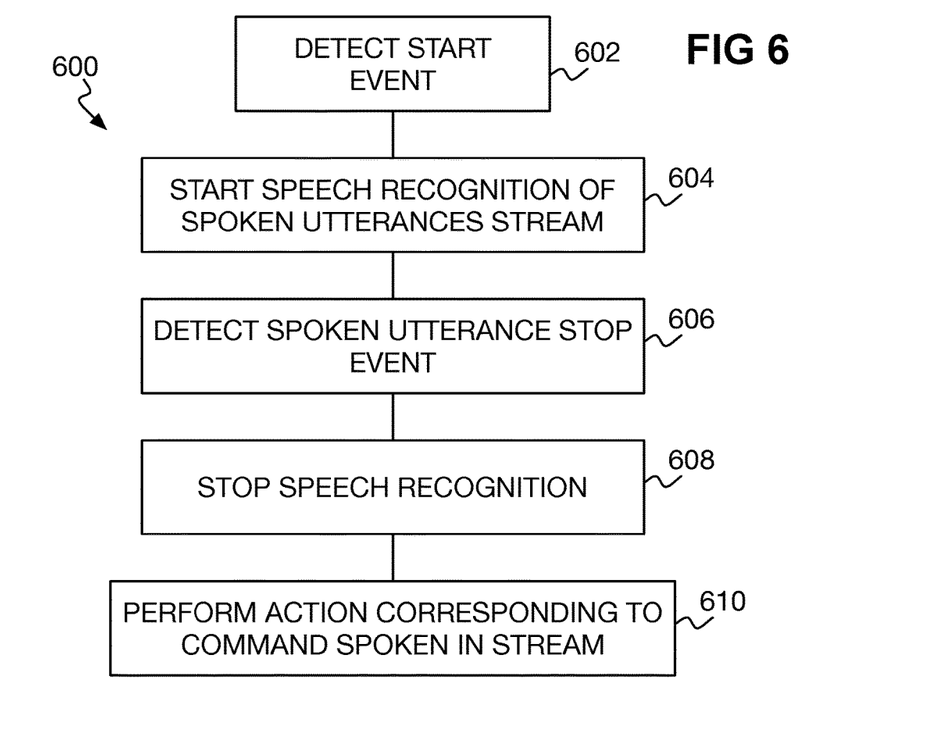
FIG. 6 is a flowchart of an example method in which a spoken utterance stop event other than a pause or cessation within a stream of spoken utterances is detected.

FIG. 6 shows an example method 600 in which the spoken utterance stop event 106 within the spoken utterances stream 100 is detected. A computing device, such as a smartphone or another type of computing device, performs the method 600. The computing device detects a start event 102 (602), and may then in response initiate or start speech recognition of the spoken utterances stream 100 that the user 202 is speaking (604). In another implementation, however, the computing device may have previously started speech recognition, before detecting the start event 102, such as in the case where the start event 102 is the user speaking a phrase of one or more predetermined start words.

After initiating speech recognition, the computing device detects the spoken utterance stop event 106 (606). The computing device can detect the spoken utterance stop event 106 in accordance with one or more of the approaches that have been described in relation to FIGS. 2A and 2B, 3, 4, and 5. More generally, the computing device can detect the stop event 106 in accordance with any approach where the stop event 106 is not a pause or cessation within the spoken utterances stream 100.

In response to detecting the spoken utterance stop event 106, the computing device may stop speech recognition of the spoken utterances stream 100 (608). However, in another implementation, the computing device may continue performing speech recognition even after detecting the stop event 106, such as in the case where the start event 102 is the user speaking a phrase of one or more predetermined start words. Doing so in this case can permit the computing device to detect another occurrence of the stop event 106, for instance.

The computing device then performs an action, or causes the action to be performed, which corresponds to the voice command 104 spoken by the user 202 within the spoken utterances stream 100 (610). That is, the computing device performs or causes to be performed an action that corresponds to the spoken utterances within the spoken utterances stream 100 at the beginning thereof following the detection of the start event 102, through and until detection of the stop event 106. This portion of the spoken utterances is that which corresponds to the voice command 104 that the user 202 wishes to be performed. The computing device causing the action to be performed encompasses the case where the computing device actually performs the action.

Figure 7:
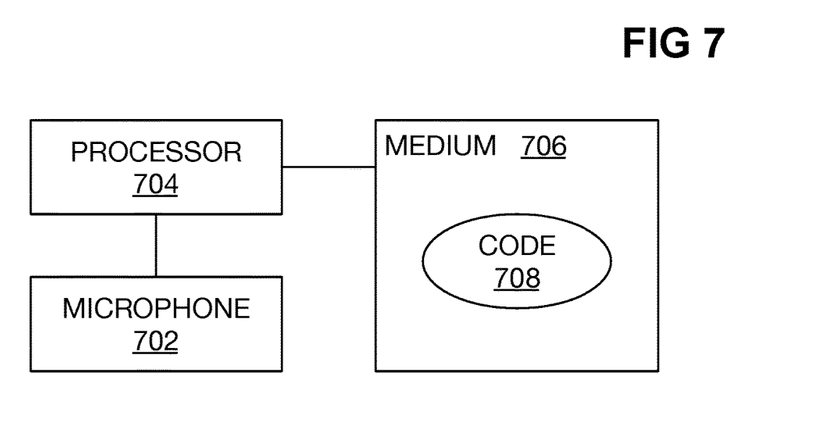
FIG. 7 is a diagram of an example system in which a spoken utterance stop event other than a pause or cessation within a stream of spoken utterances is detected.

FIG. 7 shows an example system 700 in which the spoken utterance stop event 106 is detected within the spoken utterances stream 100. The system 700 includes at least a microphone 702, a processor 704, and a non-transitory computer-readable data storage medium 706 that stores computer-executable code 706. The system 700 can and typically does include other hardware components, in addition to those depicted in FIG. 7. The system 700 may be implemented within a single computing device, such as a smartphone, or a computer like a desktop or laptop computer. The system 700 can also be implemented over multiple computing devices. For example, the processor 704 and the medium 706 may be part of a smartphone, whereas the microphone may be that of an automotive vehicle in which the smartphone is currently located.

The processor 704 executes the code 708 from the computer-readable medium 706 in relation to the spoken utterances stream 100 detected by the microphone 702 to perform the method 600 that has been described. That is, the stream 100 uttered by the user 202 is detected by the microphone 702. The processor 704, and thus the system 700, thus can perform or cause to be performed an action corresponding to a voice command 104 within the stream 100. To determine when the user has stopped speaking the voice command 104, the processor 704, and thus the system 700, detects the spoken utterance stop event 106, such as according to one or more of the approaches described in relation to FIGS. 2A and 2B, 3, 4, and 5.

The techniques that have been described therefore permit more natural and user-friendly voice interaction between a user and a computing device. A user does not have to pause or cease speaking after issuing a voice command to the computing device. Rather, the computing device detects an active or passive spoken utterance stop event to determine when in the course of speaking a stream of utterances the user has finished speaking the voice command itself.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   after initiating speech recognition of a stream of spoken utterances, detecting, by a computing device that initiated the speech recognition of the stream, a spoken utterance stop event to stop the speech recognition, the spoken utterance stop event being other than a pause or cessation in the stream of spoken utterances;
   in response to not detecting the spoken utterance stop event, continuing to perform the speech recognition on the stream of spoken utterances;
   in response to detecting the spoken utterance stop event, stopping, by the computing device, the speech recognition of the stream of spoken utterances, while the stream of spoken utterances continues; and
   after stopping the speech recognition of the stream of spoken utterances, controlling a functionality of the computing device, by the computing device, according to the spoken utterances from a beginning of the stream through and until the spoken utterance stop event,
   wherein the spoken utterance stop event is a change in speech pattern within the stream of spoken utterances, the spoken utterances having a first speech pattern within the stream prior to the spoken utterance stop event and a second speech pattern within the stream after the spoken utterance stop event, the second speech pattern different than the first speech pattern,
   and wherein the first speech pattern is a manner of speech that a user speaking the spoken utterances uses to speak to the computing device through a microphone to initiate an action to be performed,
   wherein the second speech pattern is a different manner of speech that the user uses to speak with other people in everyday conversation,
   wherein stopping the speech recognition responsive to detecting the spoken utterance stop event improves a speech interface for the computing device, by permitting a user to more naturally interact with the computing device to control the computing device, detection of the spoken utterance stop event ensuring that the computing device will not mistakenly interpret other speech by the user as intended to control the computing device and permitting the computing device to more accurately distinguish speech uttered to control the computing device from the other speech not utterance to control the computing device.

2. The method of claim 1, further comprising:
   detecting, by the computing device, a start event to start the speech recognition of the stream of spoken utterances; and
   in response to detecting the start event, initiating the speech recognition of the stream of spoken utterances.

3. The method of claim 1, wherein the method improves voice interaction between a user and the computing device.

4. The method of claim 1, wherein the action is performed on the computing device.

5. A system comprising:
   a microphone to detect a stream of spoken utterances;
   a processor; and
   a non-transitory computer-readable data storage medium storing computer-executable code that the processor executes to:
      initiate speech recognition of the stream of spoken utterances while the microphone is detecting the stream;
      while the speech recognition of the stream of spoken utterances is occurring, determine that a spoken utterance stop event has occurred in relation to the stream, the spoken utterance stop event being other than a pause or cessation in the stream;
      in response to not detecting the spoken utterance stop event, continuing to perform the speech recognition on the stream of spoken utterances; and
      in response to determining that the spoken utterance stop event has occurred, cause an action to be performed corresponding to the speech recognition of the stream through and until the spoken utterance stop event,
   wherein in executing the computer-executable code, the processor improves computing device-user voice interaction,
   wherein the spoken utterance stop event is a change in direction of the spoken utterances within the stream, the spoken utterances having a first direction within the stream prior to the spoken utterance stop event and a second direction within the stream after the spoken utterance stop event, the second direction different than the first direction,
   wherein the first direction corresponds to a user speaking the spoken utterances while being directed towards a microphone, and the second direction corresponds to the user speaking the spoken utterances while being directed away from the microphone,
   wherein stopping the speech recognition responsive to detecting the spoken utterance stop event improves a speech interface for the system, by permitting a user to more naturally interact with the system to control the system, detection of the spoken utterance stop event ensuring that the system will not mistakenly interpret other speech by the user as intended to control the system and permitting the system to more accurately distinguish speech uttered to control the system from the other speech not utterance to control the system.

6. The system of claim 5, wherein the action controls functionality of the computing device.

7. The system of claim 5, wherein the action is performed on the computing device.

8. The system of claim 5, wherein the processor is to execute the computer-executable to further:
  detect a start event to start the speech recognition of the stream of spoken utterances; and
  in response to detecting the start event, initiate the speech recognition of the stream of spoken utterances.

9. A non-transitory computer-readable data storage medium storing computer-executable code that a computing device executes to:
  while speech recognition of a stream of spoken utterances is occurring, determine that a spoken utterance stop event has occurred in relation to the stream, the spoken utterance stop event being other than a pause or cessation in the stream;
    in response to not detecting the spoken utterance stop event, continuing to perform the speech recognition on the stream of spoken utterances; and
  in response to determining that the spoken utterance stop event has occurred, cause an action to be performed on the computing device corresponding to the speech recognition of the stream through and until the spoken utterance stop event,
  wherein the spoken utterance stop event is a change in context of the spoken utterances within the stream, the spoken utterances having a first context within the stream prior to the spoken utterance stop event and a second context within the stream after the spoken utterance stop event, the second context different than the first context,
  wherein the first context corresponds to the action to be performed, and the second context does not correspond to the action to be performed,
  wherein stopping the speech recognition responsive to detecting the spoken utterance stop event improves a speech interface for the computing device, by permitting a user to more naturally interact with the computing device to control the computing device, detection of the spoken utterance stop event ensuring that the computing device will not mistakenly interpret other speech by the user as intended to control the computing device and permitting the computing device to more accurately distinguish speech uttered to control the computing device from the other speech not utterance to control the computing device.

10. The non-transitory computer-readable data storage medium of claim 9, wherein the action controls functionality of the computing device.

11. The non-transitory computer-readable data storage medium of claim 9, wherein in executing the computer-executable code, the computing device improves computing device-user voice interaction.

12. The non-transitory computer-readable data storage medium of claim 9, wherein the computing device executes the computer-executable to further:
  detect a start event to start the speech recognition of the stream of spoken utterances; and
  in response to detecting the start event, initiate the speech recognition of the stream of spoken utterances.

* * * * *